INVENTOR.
ROBERT W. OGLE
BY
ATTORNEYS

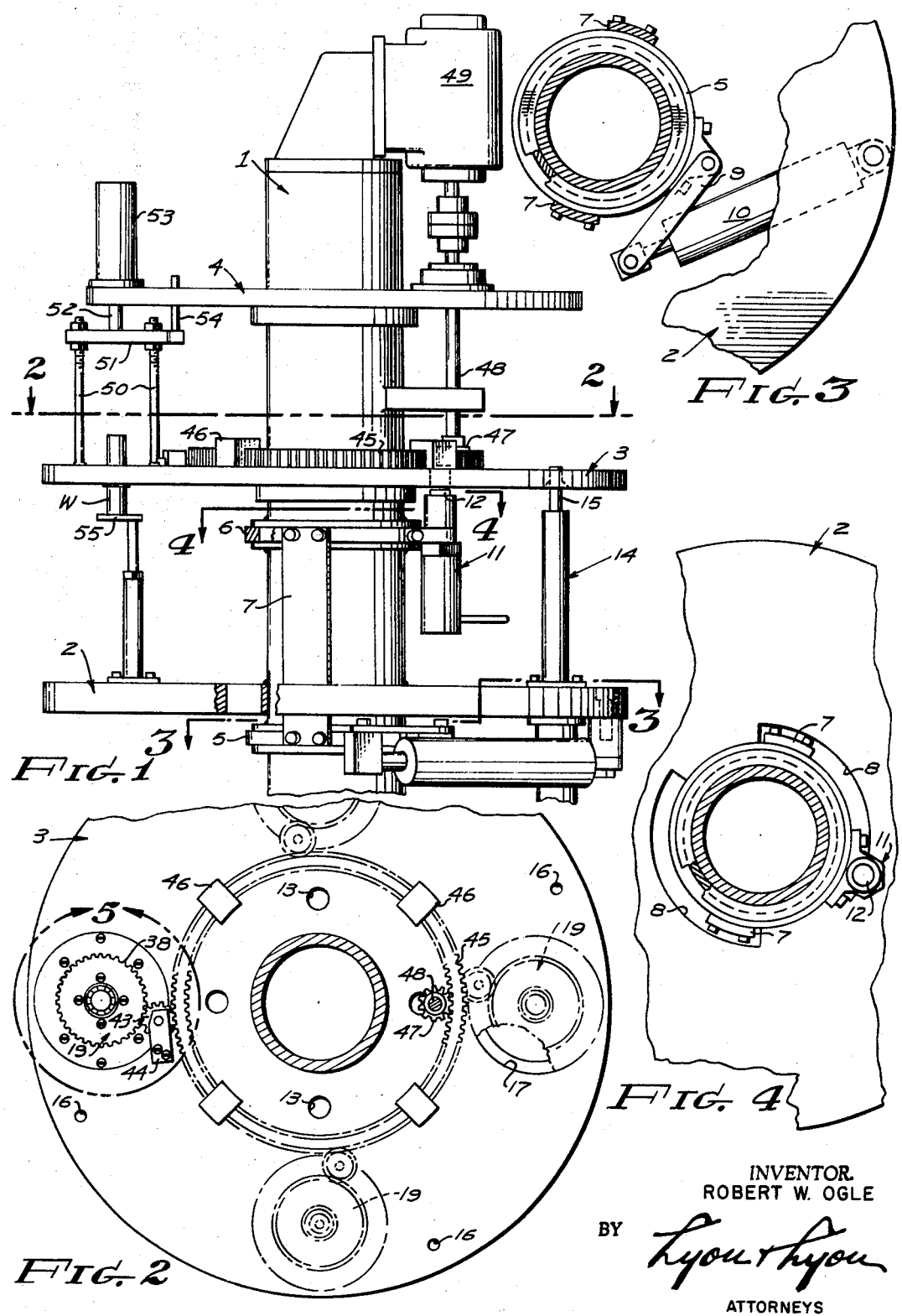

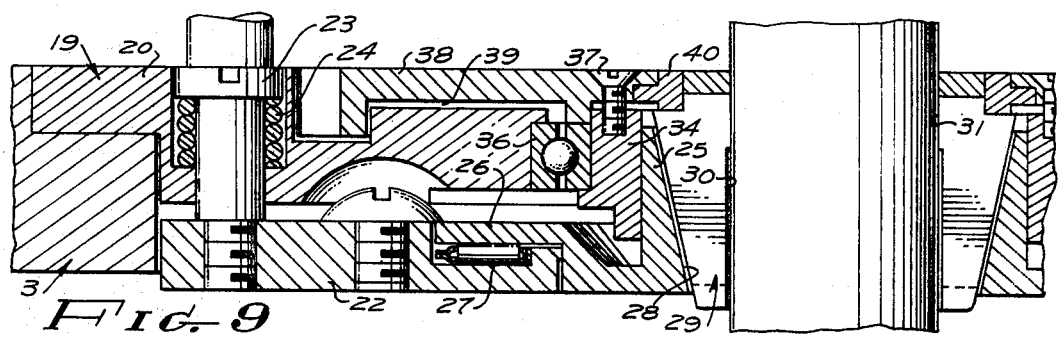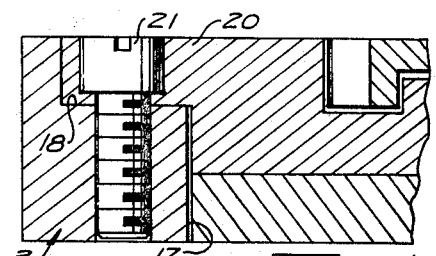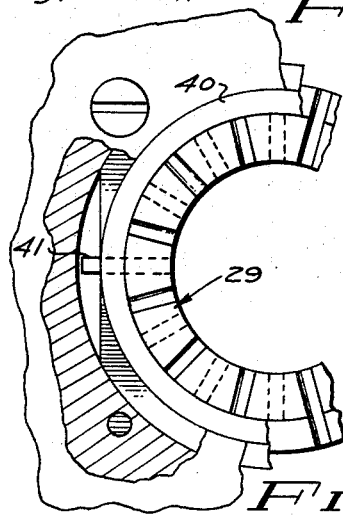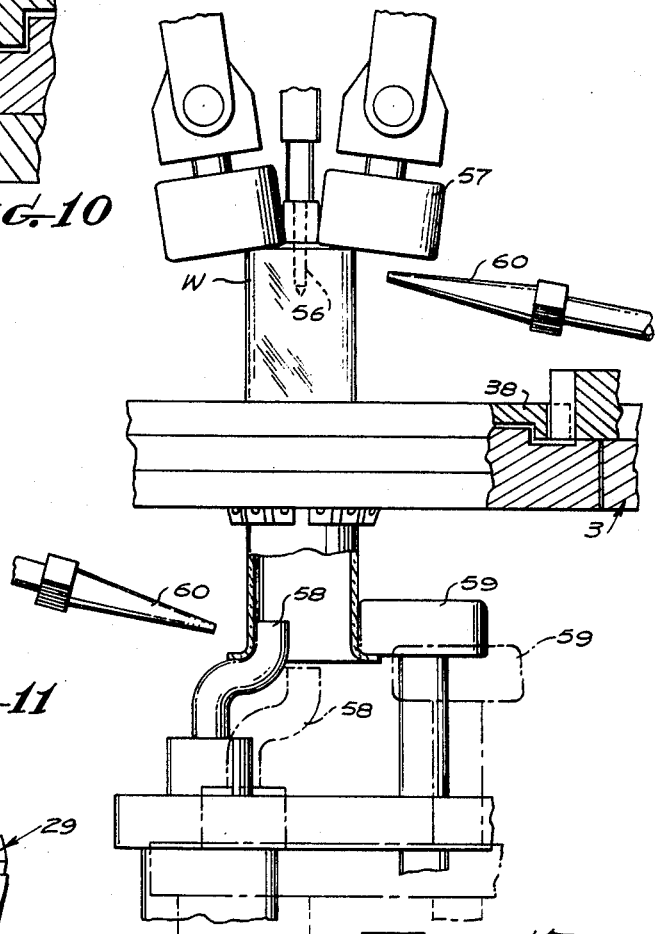

3,472,643
APPARATUS FOR FORMING GLASS ARTICLES
Robert W. Ogle, Phoenix, Ariz., assignor to Silitron Corporation, Wilmington, Del., a corporation of Delaware
Filed July 29, 1966, Ser. No. 568,781
Int. Cl. C03b 23/06, 23/08
U.S. Cl. 65—292                    4 Claims

ABSTRACT OF THE DISCLOSURE

An apparatus for forming glass articles whereby a ring of chuck assemblies and a table upon which they are carried, are advanced to place said chuck assemblies in sequence at predetermined stations. Each chuck assembly includes a radially expansible and contractable collet which grips a glass workpiece intermediate its ends so that forming tools, positioned at a selected station, can engage the exposed ends simultaneously. Contraction of the collets is accomplished by yieldable non-rotatable collet control means.

---

This invention relates to a means and method for forming glass articles and included in the objects of this invention are:

First, to provide a means and method whereby a glass blank is held intermediate its ends and rotated while the ends of the glass blank are heated and forming tools are applied simultaneously.

Second, to provide a means and method for forming glass articles in which, by reason of the fact that operations are performed simultaneously on opposite ends of a blank, the number of stations through which the article must pass are materially reduced.

Third, to provide a means for forming glass articles which incorporates a novel chuck or collet for holding glass articles and a novel means for rotating the workpiece.

With the above and other objects in view, as may appear hereinafter, reference is directed to the accompanying drawings in which:

FIGURE 1 is a fragmentary side view of the means for forming glass articles.

FIGURE 2 is a fragmentary transverse sectional view taken through 2—2 of FIGURE 1.

FIGURE 3 is a fragmentary sectional view taken through 3—3 of FIGURE 1.

FIGURE 4 is a fragmentary transverse sectional view taken through 4—4 of FIGURE 1.

FIGURE 9 is a fragmentary sectional view corresponding to FIGURE 7, but showing a part of the chuck assembly as they appear when the collet is released or expanded.

FIGURE 10 is a fragmentary sectional view through 10—10 of FIGURE 5.

FIGURE 11 is a fragmentary sectional view through 11—11 of FIGURE 8.

FIGURE 12 is a perspective view of the collet member.

FIGURE 13 is a fragmentary edge view of a chuck assembly, with portions in section, showing a workpiece therein and typical forming tools in operative engagement with the extremities of the workpiece.

Figure 5:
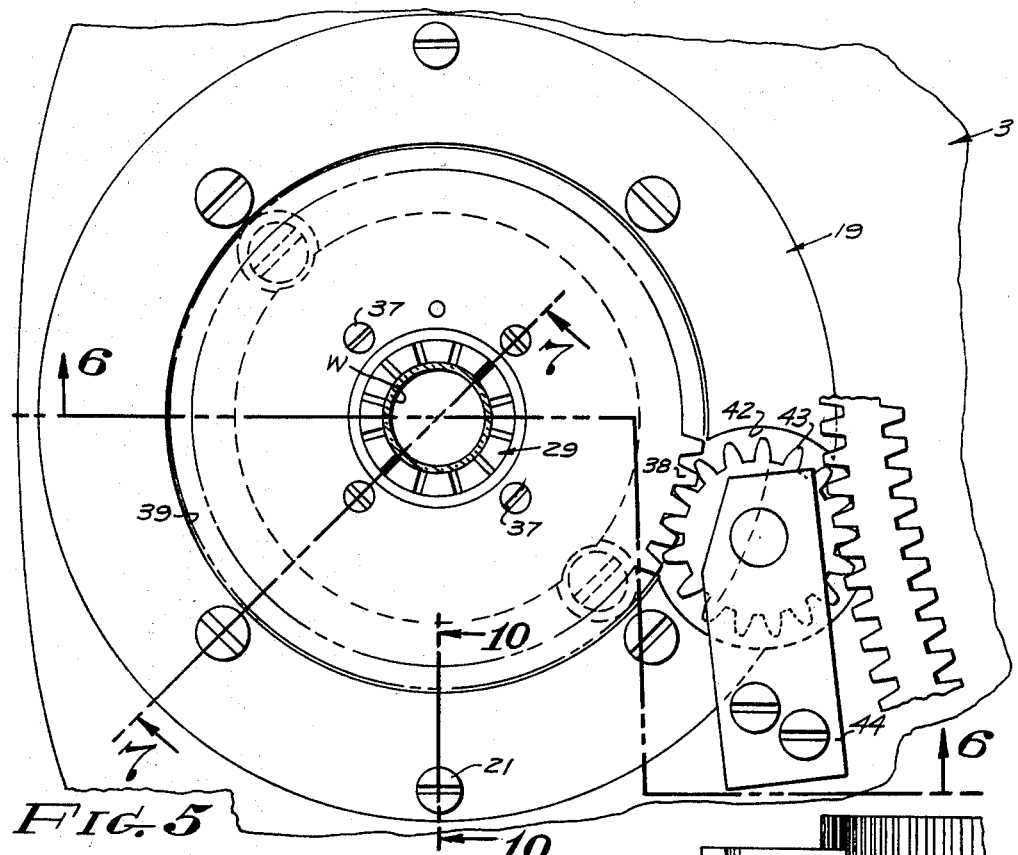
FIGURE 5 is an enlarged fragmentary plan view taken within circle 5 of FIGURE 2.
Figure 6:
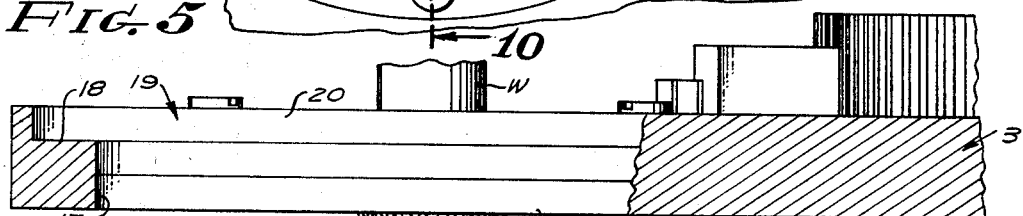
FIGURE 6 is a fragmentary sectional view taken through 6—6 of FIGURE 5.

The means for forming glass articles includes a central mounting post 1, on which is secured a lower fixed plate 2, circular in plan. Journaled on the mounting post 1, above the plate 2, is a rotatable table 3. Secured to the mounting post 1, above the table 3, is an upper fixed plate 4. The table 3 and fixed plate 4 are both circular.

Journaled on the mounting post 1, below the lower fixed plate 2, is a lower indexing ring 5 and similarly journaled on the mounting post 1, between the lower fixed plate 2 and the table 3, is an upper indexing ring 6. The two rings are joined for movement in unison by connecting bars 7, which pass through clearance slots 8, provided in the lower fixed plate 2.

Attached to the lower indexing ring 5 is a link 9, which is connected to a drive unit 10. The drive unit may be hydraulically operated and thus comprise a piston and cylinder from which extends a stem to which the link 9 is attached. The fixed end of the drive unit is secured to the underside of the lower plate 2.

Supported from the upper indexing ring 6 is an indexing unit 11 which is hydraulically operated and includes a piston and cylinder from which extends an indexing pin 12. The indexing pin, when extended, enters one of a ring of drive holes 13 provided in the table 3.

Mounted on the lower plate 2 is an upstanding locking unit 14 which may be hydraulically operated and thus comprise a piston and cylinder from which extends a locking pin 15 adapted to engage keeper holes 16 provided in the table 3.

The table 3 is provided with a ring of symmetrically located chuck receiving openings 17, each having an upwardly facing shoulder 18. Each opening receives a chuck assembly 19 which includes a fixed mounting ring 20, having a flange overlying the shoulder 18 and attached thereto by screws 21.

Figure 7:
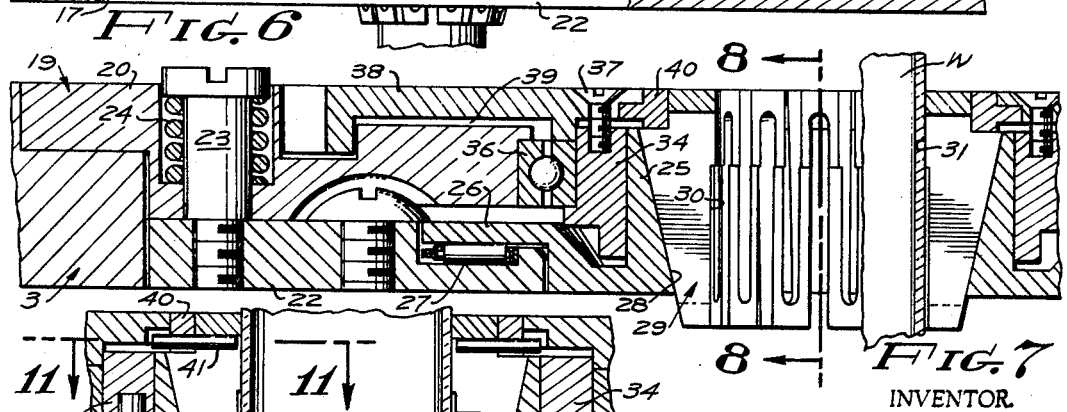
FIGURE 7 is a further enlarged fragmentary sectional view taken through 7—7 of FIGURE 5.

Suspended under the fixed mounting ring 20 is a collet control ring or non-rotatable thrust ring 22, which is supported by means of release pins 23, which extend upwardly through the mounting ring 20. The release pins are urged upwardly by means of springs 24 so that the collet control ring 22 normally occupies the position shown in FIGURE 7, but may be pressed downward to the position shown in FIGURE 9.

Journaled within the collet control ring 22, is a collet retaining ring or rotatable thrust ring 25. The collet retaining ring is provided with a radially outwardly directed flange 26 which overlies the inner periphery of the collet control ring 22. A thrust bearing 27 is interposed between the flange 26 and the control ring 22. The central portion of the collet retaining ring 25 is in the form of an upstanding cylinder, having a conical bore 28, the walls of which converge downward.

The conical bore receives a collet 29, the outer walls of which correspond to the conical bore. The collet is provided with a cylindrical bore 30, with a slight constriction forming an annular gripping land 31. The walls of the collet are provided with a ring of downwardly directed slots 32 interposed between upwardly directed slots 33, as shown best in FIGURE 12, so that the walls of the collet may expand or contract a limited distance.

Figure 8:
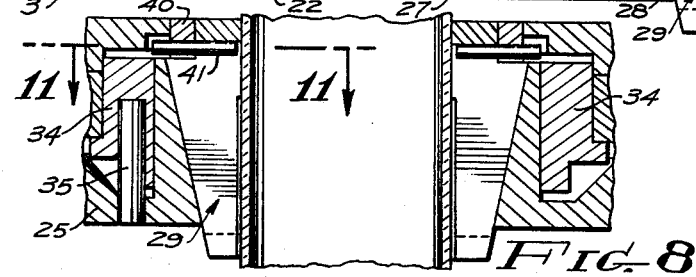
FIGURE 8 is a fragmentary sectional view taken through 8—8 of FIGURE 7.

Surrounding the upstanding portion of the collet retaining ring 25 is a drive ring 34, connected to the retaining ring 25 by a drive pin 35 shown in FIGURE 8. The drive ring 34 is journaled within the mounting ring 20 by means of a bearing 36. The drive ring 34 is connected by screws 37 to a drive gear 38 which overlies the inner portion of the fixed mounting ring 20. The drive gear is preferably set within an annular recess 39 provided in the mounting ring 20 so that the upper surface of the drive gear is flush with the upper surface of the mounting ring 20.

To prevent upward displacement of the collet 29, the inner periphery of the drive gear 38 is provided with a retainer ring 40 which is connected to the collet by means of pins 41 shown in FIGURE 8.

At one side, the mounting ring 20 is provided with a recess 42 which receives a transfer pinion gear 43. The table 3, adjacent to each opening 7, is provided with a complementary recess to clear the pinion gears 43 of the chuck assemblies 19. A bracket 44 extends over each transfer pinion gear 43 and is provided with a pin for journaling the gear as shown best in FIGURE 5.

Mounted on the table 3, in concentric relation with the mounting post 1, is a ring gear 45, having internal as well as external teeth. The ring gear is journaled within a set of guide bearings 46. The transfer pinion gears 43 project above the surface of the table 3 so as to be engaged about the outer teeth of the ring gear 45. The internal teeth of the ring gear are engaged by a drive pinion 47, mounted on an upwardly directed shaft 48. Supported from the upper end of the mounting post 1 is a motor 49 connected to the shaft 48.

In the construction illustrated, four release pins 23 are provided. The upper ends of these pins are exposed at the top of the table 3 and are adapted to be engaged by four vertically moveable rods 50 secured to a common plate 51. The plate is joined to a central shaft 52 which extends from a hydraulic operating unit 53 supported by the upper plate 4, and an offset guide bar 54 maintains the orientation of the plate 51.

One set of release rods 50 may be provided so that the chuck assemblies may be moved in sequence into registry. In this case, the release rods define a loading and unloading station. It should be noted, however, that two sets of release rods may be provided so as to establish two stations, one at which the workpieces are inserted and the other at which the workpieces are discharged. The workpieces designated W are, in their blank form, cylindrical lengths of glass tubing which are held intermediate their ends by the collets 29. In order that the workpieces be extended a predetermined distance below the collets, an adjustable stop 55 is supported from the lower plate 2.

At another station, occupied by the chuck assemblies in sequence, are positioned upper forming tools 56 and 57 engageable internally and externally with the upper end of each workpiece. The upper forming tools shown fragmentarily in FIGURE 13 are suitably supported from the upper fixed plate 4. Similarly at the same station, there is provided lower forming tools 58 and 59 which engage the internal and external surfaces of the workpiece at its lower end. Burners 60 direct flames against the extremities of the workpiece so as to soften the glass and permit the forming tools to function.

It should be noted that for the purposes of this application, the forming tools and their means of manipulation are conventional.

A station subsequent to the station at which the ends of each workpiece are simultaneously formed is provided with suitable annealing torches not shown.

Operation of the means for forming glass articles is as follows:

The several chuck assemblies 19 are rotated continuously about their respective axes. The collet 29 of each chuck assembly 19 is moved to its open position by the release rods 50 as each chuck assembly is moved to the receiving station. If the receiving station is also the discharge station, the formed workpiece is removed and the blank workpiece in the form of a glass tube, is inserted. The workpiece is then advanced to the forming station and both ends are heated simultaneously and both ends are worked upon by the forming tools simultaneously. After the workpiece is formed, or partially formed, at the forming station, it may be advanced to subsequent forming stations and to an annealing station, and finally to the discharge station. It is preferred that the discharge station be separate from the receiving station so that the workpiece blanks may be inserted by automatic means not shown and the finished workpieces may be dropped from the chuck assemblies without manual intervention. In order that this be accomplished, the forming operations on the upper end of the blank are such as to avoid increase in the diameter so that the furnished workpiece may drop through the collet.

If a single station is provided for receiving and removing the workpieces, the lower ends of the workpieces are not enlarged so that the workpieces, when finished, may be listed from the chuck.

The method of forming glass articles consists essentially in supporting a tubular blank intermediate its ends in such a manner that the ends of the blank are accessible to forming tools and to heating means and then simultaneously forming both ends of the blank.

I claim:

1. An apparatus for forming glass articles comprising:
    (a) a table mounted for rotation;
    (b) a ring of chuck assemblies carried by said table;
    (c) means for advancing said table and chuck assemblies to place the chuck assemblies in sequence at pre-determined stations;
    (d) each chuck assembly including a radially expansible and contractable collet, open at both ends, to grip a cylindrical glass workpiece intermediate its ends thus affording access to both ends of said workpiece secured in said collet; means for rotatably supporting said collet; and yieldable nonrotatable collet control means biased to contract said collet;
    (e) means at one of said stations engageable with said collet control means to expand the collet of each chuck assembly in sequence for insertion of a workpiece therein;
    (f) forming tools at a selected station positioned to engage the exposed ends of said workpiece simultaneously; and
    (g) means for rotating all of said collets about their respective axes.

2. The apparatus for forming glass articles of claim 1 wherein:
    (a) each of said chuck assemblies includes a drive gear positioned to rotate said workpiece;
    (b) a ring gear, coaxial with said drive gear, which is operatively connected thereto so as to turn said drive gear; and
    (c) a drive pinion which is positioned to engage said ring gear.

3. The apparatus for forming glass articles of claim 1 wherein:
    (a) said means for advancing includes an indexing ring concentric with and engageable with said table;
    (b) said means for advancing further includes a drive means connected to said indexing ring to effect advance of said table by predetermined increments;
    (c) means for locking said table in pre-determined positions.

4. An apparatus for forming glass articles comprising:
    (a) a vertical post;
    (b) a pair of fixed plates mounted thereon;
    (c) a table journaled on said post, including means defining a ring of chuck receiving aperatures;
    (d) means secured to one of said plates and rotatable about said post for indexing said ring of chuck receiving aperatures to locate said apertures in sequence at selected stations;
    (e) a chuck assembly secured to each aperture, each chuck assembly including a radially expansible and contractable collet, open at both ends, to grip a cylindrical glass workpiece intermediate its ends thus affording access to both ends of said workpiece secured in said collet; means for rotatably supporting said collet; and yieldable non-rotatable collet control means biased to contract said collet;

(f) means engageable with said collet control means to expand the collet of each chuck assembly in sequence for insertion of a workpiece therein;

(g) forming tools positioned to engage the exposed ends of said workpiece simultaneously; and (h) means for rotating all of said collets about their respective axes.

References Cited
UNITED STATES PATENTS

| | | | |
|---|---|---|---|
| 3,171,730 | 3/1965 | Zauner | 65—109 |
| 2,649,659 | 8/1953 | Kahle | 65—227 |

S. LEON BASHORE, Primary Examiner

SAUL R. FRIEDMAN, Assistant Examiner

U.S. Cl. X.R.
65—109, 280, 296